United States Patent
Hennessy

(10) Patent No.: US 9,853,454 B2
(45) Date of Patent: Dec. 26, 2017

(54) VANADIUM REDOX BATTERY ENERGY STORAGE SYSTEM

(75) Inventor: Timothy David John Hennessy, Portland, OR (US)

(73) Assignee: JD Holding Inc., George Town, Grand Cayman (KY)

( * ) Notice: Subject to any disclaimer, the term of this patent is extended or adjusted under 35 U.S.C. 154(b) by 769 days.

(21) Appl. No.: 13/332,002

(22) Filed: Dec. 20, 2011

(65) Prior Publication Data

US 2013/0154364 A1    Jun. 20, 2013

(51) Int. Cl.
| | |
|---|---|
| H02J 1/10 | (2006.01) |
| H02J 3/38 | (2006.01) |
| H01M 8/04858 | (2016.01) |
| H01M 8/18 | (2006.01) |
| H01M 8/04537 | (2016.01) |
| H01M 8/04955 | (2016.01) |
| H01M 8/20 | (2006.01) |

(52) U.S. Cl.
CPC ........... *H02J 3/387* (2013.01); *H01M 8/0488* (2013.01); *H01M 8/04604* (2013.01); *H01M 8/04955* (2013.01); *H01M 8/188* (2013.01); *H01M 8/20* (2013.01); *Y02E 40/10* (2013.01); *Y02E 60/528* (2013.01); *Y10T 307/305* (2013.01); *Y10T 307/707* (2013.01)

(58) Field of Classification Search
CPC .. H02J 3/387; H01M 8/04955; H01M 8/0488; H01M 8/04604; H01M 8/188; H01M 8/20; Y10T 307/707; Y10T 307/305; Y02E 40/10; Y02E 60/528
USPC .......................................................... 307/43
See application file for complete search history.

(56) References Cited

U.S. PATENT DOCUMENTS

| | | |
|---|---|---|
| 3,279,949 A | 10/1966 | Schaefer et al. |
| 3,530,003 A | 9/1970 | Warszawski et al. |
| 3,666,561 A | 5/1972 | Chiku |
| 3,996,064 A | 12/1976 | Thaller |
| 4,018,508 A | 4/1977 | McDermott et al. |
| 4,181,777 A | 1/1980 | Spaziante et al. |
| 4,287,465 A | 9/1981 | Godard et al. |
| 4,312,735 A | 1/1982 | Grimes et al. |

(Continued)

FOREIGN PATENT DOCUMENTS

| | | |
|---|---|---|
| AT | 509 888 A4 | 12/2011 |
| AU | 55562/86 A | 8/1987 |

(Continued)

OTHER PUBLICATIONS

Notice of Allowance and Fee(s) Due for U.S. Appl. No. 12/975,709, filed Dec. 22, 2010 and mailed Mar. 3, 2014, 12 pgs.

(Continued)

*Primary Examiner* — Daniel Cavallari
(74) *Attorney, Agent, or Firm* — Stoel Rives LLP

(57) ABSTRACT

A redox battery energy storage system including multiple energy storage stacks having multiple reactor cells is disclosed. Each of the energy storage stacks may include an integrated DC/DC converter configured to convert an output voltage of the stacks to a higher output voltage. The output of the DC/DC converts may be coupled in parallel to an energy storage system output bus. By configuring the energy storage system in this manner, inefficiencies and losses caused by shunt electrical currents in the systems may be decreased.

18 Claims, 2 Drawing Sheets

(56) References Cited

U.S. PATENT DOCUMENTS

| | | | |
|---|---|---|---|
| 4,362,791 A | 12/1982 | Kaneko et al. | |
| 4,371,433 A | 2/1983 | Balko et al. | |
| 4,410,606 A | 10/1983 | Loutfy et al. | |
| 4,786,567 A | 11/1988 | Skyllas-Kazacos et al. | |
| 4,797,566 A | 1/1989 | Nozaki et al. | |
| 4,908,281 A | 3/1990 | O'Callaghan | |
| 4,927,509 A | 5/1990 | Mathur et al. | |
| 4,956,244 A | 9/1990 | Shimizu et al. | |
| 5,225,712 A | 7/1993 | Erdman | |
| 5,250,158 A | 10/1993 | Kaneko et al. | |
| 5,308,718 A | 5/1994 | Eidler et al. | |
| 5,318,865 A | 6/1994 | Kaneko et al. | |
| 5,368,762 A | 11/1994 | Sato et al. | |
| 5,484,666 A | 1/1996 | Gibb et al. | |
| 5,486,430 A | 1/1996 | Gorbell et al. | |
| 5,512,787 A | 4/1996 | Dederick | |
| 5,587,132 A | 12/1996 | Nakajima et al. | |
| 5,601,943 A | 2/1997 | Eidler et al. | |
| 5,656,390 A | 8/1997 | Kageyama et al. | |
| 5,665,212 A | 9/1997 | Zhong et al. | |
| 5,725,967 A | 3/1998 | Tuttle | |
| 5,734,255 A | 3/1998 | Thompson et al. | |
| 5,759,711 A | 6/1998 | Miyabayashi et al. | |
| 5,851,694 A | 12/1998 | Miyabayashi et al. | |
| 6,086,643 A | 7/2000 | Clark et al. | |
| 6,143,443 A | 11/2000 | Kazacos et al. | |
| 6,219,623 B1 | 4/2001 | Wills | |
| 6,239,508 B1* | 5/2001 | Faris et al. | 307/9.1 |
| 6,242,125 B1 | 6/2001 | Eidler et al. | |
| 6,261,714 B1 | 7/2001 | Eidler et al. | |
| 6,414,653 B1 | 7/2002 | Kobayashi | |
| 6,416,653 B1 | 7/2002 | Barben, II et al. | |
| 6,461,772 B1 | 10/2002 | Miyake et al. | |
| 6,468,688 B2 | 10/2002 | Kazacos et al. | |
| 6,475,661 B1 | 11/2002 | Pellegri et al. | |
| 6,519,041 B1 | 2/2003 | Berthold | |
| 6,524,452 B1 | 2/2003 | Clark et al. | |
| 6,544,679 B1 | 4/2003 | Petillo et al. | |
| 6,555,267 B1 | 4/2003 | Broman et al. | |
| 6,558,833 B2 | 5/2003 | McCoy | |
| 6,562,514 B1 | 5/2003 | Kazacos et al. | |
| 6,563,234 B2 | 5/2003 | Hasegawa et al. | |
| 6,609,081 B1 | 8/2003 | de Varennes et al. | |
| 6,613,298 B2 | 9/2003 | Tanaka et al. | |
| 6,670,721 B2 | 12/2003 | Lof et al. | |
| 6,680,547 B1 | 1/2004 | Dailey | |
| 6,761,945 B1 | 7/2004 | Adachi et al. | |
| 6,764,789 B1 | 7/2004 | Sekiguchi et al. | |
| 6,809,431 B1 | 10/2004 | Schippmann | |
| 6,858,953 B2 | 2/2005 | Stahlkopf | |
| 6,875,535 B2 | 4/2005 | Ye et al. | |
| 6,916,579 B2 | 7/2005 | Gorchkov et al. | |
| 7,052,796 B2 | 5/2006 | Sabin et al. | |
| 7,061,205 B2 | 6/2006 | Shigematsu et al. | |
| 7,078,123 B2 | 7/2006 | Kazacos et al. | |
| 7,083,875 B2 | 8/2006 | Lillis et al. | |
| 7,181,183 B1 | 2/2007 | Hennessy | |
| 7,184,903 B1 | 2/2007 | Williams et al. | |
| 7,199,550 B2 | 4/2007 | Tsutsui et al. | |
| 7,220,515 B2 | 5/2007 | Ito et al. | |
| 7,227,275 B2 | 6/2007 | Hennessy et al. | |
| 7,258,947 B2 | 8/2007 | Kubata et al. | |
| 7,265,456 B2 | 9/2007 | Hennessy | |
| 7,353,083 B2 | 4/2008 | Hennessy | |
| 7,361,427 B1 | 4/2008 | Dow et al. | |
| 7,389,189 B2 | 6/2008 | Williams et al. | |
| 7,517,608 B2 | 4/2009 | Brereton et al. | |
| 7,682,728 B2 | 3/2010 | Harper | |
| 7,687,193 B2 | 3/2010 | Harper | |
| 7,704,634 B2 | 4/2010 | Deguchi et al. | |
| 7,740,977 B2 | 6/2010 | Lepp et al. | |
| 8,026,013 B2 | 9/2011 | Valensa et al. | |
| 8,048,555 B2 | 11/2011 | Darcy et al. | |
| 8,541,138 B2 | 9/2013 | Kazacos et al. | |
| 2001/0028977 A1 | 10/2001 | Kazacos et al. | |
| 2003/0087156 A1 | 5/2003 | Broman et al. | |
| 2003/0143456 A1 | 7/2003 | Kazacos et al. | |
| 2004/0036360 A1 | 2/2004 | McCombs | |
| 2004/0044442 A1 | 3/2004 | Bayoumi et al. | |
| 2004/0113431 A1 | 6/2004 | Huang | |
| 2004/0121204 A1 | 6/2004 | Adelman et al. | |
| 2004/0151953 A1 | 8/2004 | Kirk et al. | |
| 2004/0158417 A1 | 8/2004 | Bonet | |
| 2004/0169493 A1 | 9/2004 | Tsutsui et al. | |
| 2004/0172943 A1 | 9/2004 | Buelow et al. | |
| 2004/0191623 A1 | 9/2004 | Kubata et al. | |
| 2004/0207207 A1 | 10/2004 | Stahlkopf | |
| 2004/0241544 A1 | 12/2004 | Nakaishi et al. | |
| 2005/0004716 A1 | 1/2005 | Lillis et al. | |
| 2005/0012395 A1 | 1/2005 | Eckroad et al. | |
| 2005/0074665 A1 | 4/2005 | Spaziante et al. | |
| 2005/0077252 A1 | 4/2005 | Shih et al. | |
| 2005/0147871 A1 | 7/2005 | Shigematsu et al. | |
| 2005/0156432 A1 | 7/2005 | Hennessy | |
| 2005/0158614 A1 | 7/2005 | Hennessy | |
| 2005/0158615 A1 | 7/2005 | Samuel et al. | |
| 2006/0142899 A1 | 6/2006 | Wobben | |
| 2006/0171086 A1 | 8/2006 | Hennessy et al. | |
| 2006/0273595 A1 | 12/2006 | Avagliano et al. | |
| 2007/0001461 A1 | 1/2007 | Hopewell | |
| 2007/0035135 A1 | 2/2007 | Yoshida | |
| 2007/0072067 A1 | 3/2007 | Symons et al. | |
| 2007/0202385 A1 | 8/2007 | Minamiura et al. | |
| 2007/0258784 A1 | 11/2007 | Looker | |
| 2008/0081247 A1 | 4/2008 | Nakaishi et al. | |
| 2008/0182157 A1 | 7/2008 | Visco et al. | |
| 2008/0220318 A1 | 9/2008 | Brereton et al. | |
| 2008/0241643 A1 | 10/2008 | Lepp et al. | |
| 2009/0004536 A1 | 1/2009 | Knauer et al. | |
| 2009/0047570 A1 | 2/2009 | Harper | |
| 2009/0047571 A1 | 2/2009 | Harper | |
| 2009/0311559 A1 | 12/2009 | Levine et al. | |
| 2010/0003545 A1 | 1/2010 | Horne et al. | |
| 2010/0003586 A1 | 1/2010 | Sahu | |
| 2010/0021805 A1 | 1/2010 | Winter | |
| 2010/0136455 A1 | 6/2010 | Winter | |
| 2011/0074357 A1* | 3/2011 | Parakulam et al. | 320/134 |
| 2011/0115425 A1* | 5/2011 | Olsson | 320/101 |
| 2011/0215645 A1* | 9/2011 | Schomburg et al. | 307/65 |
| 2011/0311896 A1 | 12/2011 | Harper et al. | |
| 2012/0217933 A1* | 8/2012 | Abe et al. | 320/128 |
| 2013/0127396 A1* | 5/2013 | Triebel et al. | 320/101 |

FOREIGN PATENT DOCUMENTS

| | | |
|---|---|---|
| AU | 85862/91 | 10/1991 |
| EP | 0 246 649 A1 | 11/1987 |
| EP | 0 517 217 A1 | 12/1992 |
| EP | 0 566 019 A1 | 10/1993 |
| EP | 0 814 527 A2 | 12/1997 |
| EP | 0 889 571 A2 | 1/1999 |
| EP | 1 284 513 A1 | 2/2003 |
| EP | 1 385 226 A1 | 1/2004 |
| EP | 1 536 506 A1 | 6/2005 |
| FR | 2.034.755 | 12/1970 |
| GB | 2 030 349 A | 4/1980 |
| GB | 2 085 475 A | 4/1982 |
| JP | 54-138502 | 10/1979 |
| JP | 56-42970 A | 4/1981 |
| JP | 57-9072 A | 1/1982 |
| JP | 57-9073 A | 1/1982 |
| JP | 60-225366 A | 11/1985 |
| JP | 63-69151 A | 3/1988 |
| JP | 07153477 A | 12/1993 |
| JP | 7-14617 A | 1/1995 |
| JP | 7-192776 A | 7/1995 |
| JP | 8-7913 A | 1/1996 |
| JP | 8-19179 A | 1/1996 |
| JP | 9-283169 A | 10/1997 |
| JP | 11-299106 A | 10/1999 |
| JP | 2003-317763 A | 11/2003 |
| JP | 2004-319341 A | 11/2004 |
| WO | WO 89/05363 A1 | 6/1989 |
| WO | WO 89/05528 A1 | 6/1989 |

(56) References Cited

FOREIGN PATENT DOCUMENTS

| | | |
|---|---|---|
| WO | WO 90/03666 A1 | 4/1990 |
| WO | WO 95/12219 A1 | 5/1995 |
| WO | WO 99/39397 A1 | 8/1999 |
| WO | WO 99/50945 A1 | 10/1999 |
| WO | WO 03/092109 A1 | 11/2003 |
| WO | WO 2004/054065 A1 | 6/2004 |
| WO | WO 2006/081514 A2 | 8/2006 |
| WO | WO 2006/089415 A1 | 8/2006 |
| WO | WO 2006/129635 A1 | 12/2006 |
| WO | WO 2008/053317 A1 | 5/2008 |
| WO | WO 2010/118060 A1 | 4/2010 |
| WO | WO 2011074330 A1 * | 6/2011 |
| WO | WO 2011/114094 A1 | 9/2011 |
| WO | WO 2011/154306 A2 | 12/2011 |
| WO | WO 2011/154306 A3 | 12/2011 |
| WO | WO 2011154306 A2 * | 12/2011 |

OTHER PUBLICATIONS

Hagedorn, Mark, et al., "NASA Redox Cell Stack Shunt Current, Pumping Power, and Cell Performance Tradeoffs," National Aeronautics and Space Administration, Lewis Research Center, Feb. 1982, 30 pgs.

Hawkins, J.M, et at., "A field of a Vanadium Energy Storage System," INTELC 2001, Oct. 2001, pp. 652-656, Conference Publication No. 484.

"Flow Battery," Flow Battery Solutions, Mar 15, 2013, <http://www.arbin.com/products/flow-battery?gclid=CKvNqLXD7bUCFed1Ogod-jcAkQ>.

Office Action mailed May 10, 2013, for application U.S. Appl. No. 12/820,972, filed Jun. 22, 2010.

Office Action for U.S. Appl. No. 12/975,709 filed Dec. 22, 2010, and mailed from the USPTO on Oct. 8, 2013, 47 pgs.

Office Action for U.S. Appl. No. 12/820,972, filed Jun. 22, 2010 and mailed from the USPTO on Dec. 20, 2012, 22 pgs.

Nguyen, Trung and Savinell, Robert F.; "Flow Batteries", *The Electrochemical Society Interface*; Fall 2010 (3 pgs.).

Norris, Benjamin L.; Lex, Peter; Ball, Greg J.; and Scaini, Vince; "Grid-Connected Solar Energy Storage Using the Zinc-Bromine Flow Battery"; (4 pgs.).

Ponce De Leon, C.; Frias-Ferrer, A.; Gonzalez-Garcia, J.; Szanto, D.A.; and Walsh, F.C.; "Redox Flow Cells for Energy Conversion"; *Elsevier B.V. ScienceDirect, Journal of Power Sources 160*, 716-732; 2006, 17 pgs.

Scamman, Daniel P.; Reade, Gavin W.; and Roberts, Edward P.L.; "Numerical Modelling of a Bromide-Polysulphide Redox Flow Battery Part 1: Modelling Approach and Validation for a Pilot-Scale System"; *Elsevier B.V. Journal of Power Sources 189*, 1120-1230; 2009, 9 pgs.

Tokuda, Nobuyuki; Kanno, Takashi; Hara, Takushi; Shigematsu, Toshio; Tsutsui, Yasumitsu; Ikeuchi, Atsuo; Itou, Takefumi; and Kumamoto, Takahiro; "Development of a Redox Flow Battery System"; *SEI Technical Review*, No. 50; Jun. 2000, 7 pgs.

ZBB Energy Corporation, Menomonee Falls, Wisconsin, United States, Product Brochure, "The Focus of Advanced Energy Storage Systems," http://www.zbbenergy.com/pdf/ZBB_CorpBrochure_Web.pd, 8 pgs.

Premium Power Corporation, North Andover, Massachusetts, United States; Powerblock 150 Specifications (2 pgs.).

Premium Power Corporation, North Andover, Massachusetts, United States; Product Brochure, "Zinc-Flow 45 Regenerative fuel cell with DC output power, for uninterrupted operation of mission-critical site infrastructure"; (2 pgs.).

Premium Power Corporation, North Reading, Massachusetts, United States, Product Brochure, "TransFlow 2000, Utility-Scale Mobile Energy Storage System," http://www.premiumpower.com/product/TF2000_2-pager.pdf, 2 pgs.

Bartolozzi, M., "Development of Redox Flow Batteries. A Historical Bibliography," Journal of Power Sources, 27 (1989), pp. 219-234.

Sum, et al., "A Study of the V(II)/V(III) Redox Couple for Redox Flow Cell Applications," Journal of power Sources, 15 (1985), pp. 179-190.

Skyllas-Kazacos et al., "Characteristics and performance of 1 kW UNSW vanadium redox battery," Journal of Power Sources, 35 (1991) pp. 399-404.

Skyllas-Kazacos et al., "Vanadium redox battery prototype: design & development," University of New South Wales, Department of Minerals and Energy, Jan. 1991, 254 pgs.

Skyllas-Kazacos et al., "Development of Redox Cell for Remote Area Energy Storage," School of Chemical Engineering & Industrial Chemistry, University of New South Wales, 200 pgs.

Kazacos et al., "Vanadium redox cell electrolyte optimization studies," Journal of Applied Electrochemistry, 1990, 20, pp. 463-467.

Kazacos, Michael, "Electrolyte Optimization and Electrode Material Evaluation for the Vanadium Redox Battery," a thesis submitted as part of the requirements for the degree of Master of Science, School of Chemical Engineering and Industrial Chemistry, The University of New South Wales, Feb. 1989, 250 pgs.

Definition of "Load" retrieved from Dictionary.com on Aug. 12, 2010.

Definition of "Electrical Power" retrieved from Dictionary.com on Aug. 12, 2010.

Close, Tullis; "Energy storage—a key technology for global energy sustainability," Journal of Power Sources 100, 2-17, 2001 (16 pgs.).

Shigematsu, T.; Kumamoto T.; Deguchi, H.; and Hara, T.; "Applications of a Vanadium Redox-Flow Batter to Maintain Power Quality," Sumitomo Electric Industries, Ltd., IEEE 2002 (6 pgs.).

Barton, John P. and Infield, David G.; "Energy Storage and Its Use with Intermittent Renewable Energy," IEEE Transactions on Energy Conversion, vol. 19, No. 2, Jun. 2004 (8 pgs.).

Nevins, Sheri et al., Article entitled "Flow Battery Solution for Smart Grid Renewable Energy Applications," Ktech Corporation, 2010 DOE Energy Storage Program Review, Nov. 10, 2010 (14 pgs.).

Liu, Galasco, and Savinell, "Enhancing Performance of the Ti(III)/Ti(IV) Couple for Redox Battery Applications," Journal of Electrochemical Society, 1981, downloaded Feb. 6, 2012, pp. 1755-1757.

Chen et al., "Solution Redox Couples for Electrochemical Energy Storage," Journal of Electrochemical Society Energy Storage (128), downloaded Feb. 6, 2012, pp. 1460-1467.

Chen et al., "Solution Redox Couples for Electrochemical Energy Storage," Journal of Electrochemical Society Energy Storage (1982), 129(1), downloaded Feb. 6, 2012, pp. 61-66.

Murthy et al., "Fe(III)/Fe(II)—Ligand Systems for Use as Negative Half-Cells in Redox-Flow Cells," Journal of Power Sources, 1989, 27(2), pp. 119-126.

6001 Chemical Abstract, 1989, No. 22, 111:198495s, printed Feb. 6, 2012, 2 pgs.

International Search Report (3 pgs.) and Written Opinion (5 pgs.), PCT/US05/36041 mailed Jul. 31, 2007, 8 pgs.

International Search Report (2 pgs.) and Written Opinion (6 pgs.) for PCT/US05/36759 mailed on Aug. 29, 2007, 8 pgs.

International Search Report(4 pgs.) and Written Opinion (6 pgs.) for PCT/US2007/14276 filed Jun. 18, 2007, mailed on Aug. 18, 2008, total 10 pgs.

International Preliminary Report for PCT/US2007/14276 filed Jun. 18, 2007, 2 pgs.

International Search Report (4 pgs.) and Written Opinion (3 pgs.) for PCT/US07/79444 filed Sep. 25, 2007, and mailed Aug. 13, 2008, 7 pgs.

International Search Report (4 pgs.) and Written Opinion (4 pgs.) for PCT/US07/14277 filed Jun. 18 2007, mailed on Aug. 18, 2008, 8 pgs.

International Search Report (5 pgs.) and Written Opinion (5 pgs.) for PCT/US2011/038607 filed May 31, 2011, and mailed Jan. 16, 2012, 10 pgs.

(56) References Cited

OTHER PUBLICATIONS

Office Action for U.S. Appl. No. 11/234,778 from USPTO mailed Sep. 19, 2007, 16 pgs.
Examiner's Report No. 1 for Patent Application No. 2005324449 filed May 9, 2007, mailed Dec. 16, 2009, 3 pgs.
Examiner's Report No. 2 for Patent Application No. 2005324449 filed May 9, 2007, mailed Jan. 7, 2011, 3 pgs.
European Search Report for Patent Application No. 05802886.1 filed Apr. 30, 2007, mailed Oct. 22, 2010, 5 pgs.
Canadian Office Action for Patent Application No. 2,585,515, filed Oct. 7, 2005, mailed Aug. 4, 2011, 3 pgs.
Non-Final Office Action for U.S. Appl. No. 13/269,362, filed Oct. 7, 2011, and mailed from the USPTO on Jan. 14, 2015, 34 pgs.
Notice of Allowance and Fee(s) Due for U.S. Appl. No. 13/605,771, filed Sep. 6, 2012, and mailed from the USPTO on Mar. 5, 2015, 26 pgs.

\* cited by examiner

VANADIUM REDOX BATTERY ENERGY STORAGE SYSTEM

TECHNICAL FIELD

This disclosure relates to redox flow battery systems and, more particularly, to an efficient design for a redox flow battery energy storage system.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

Figure 1:
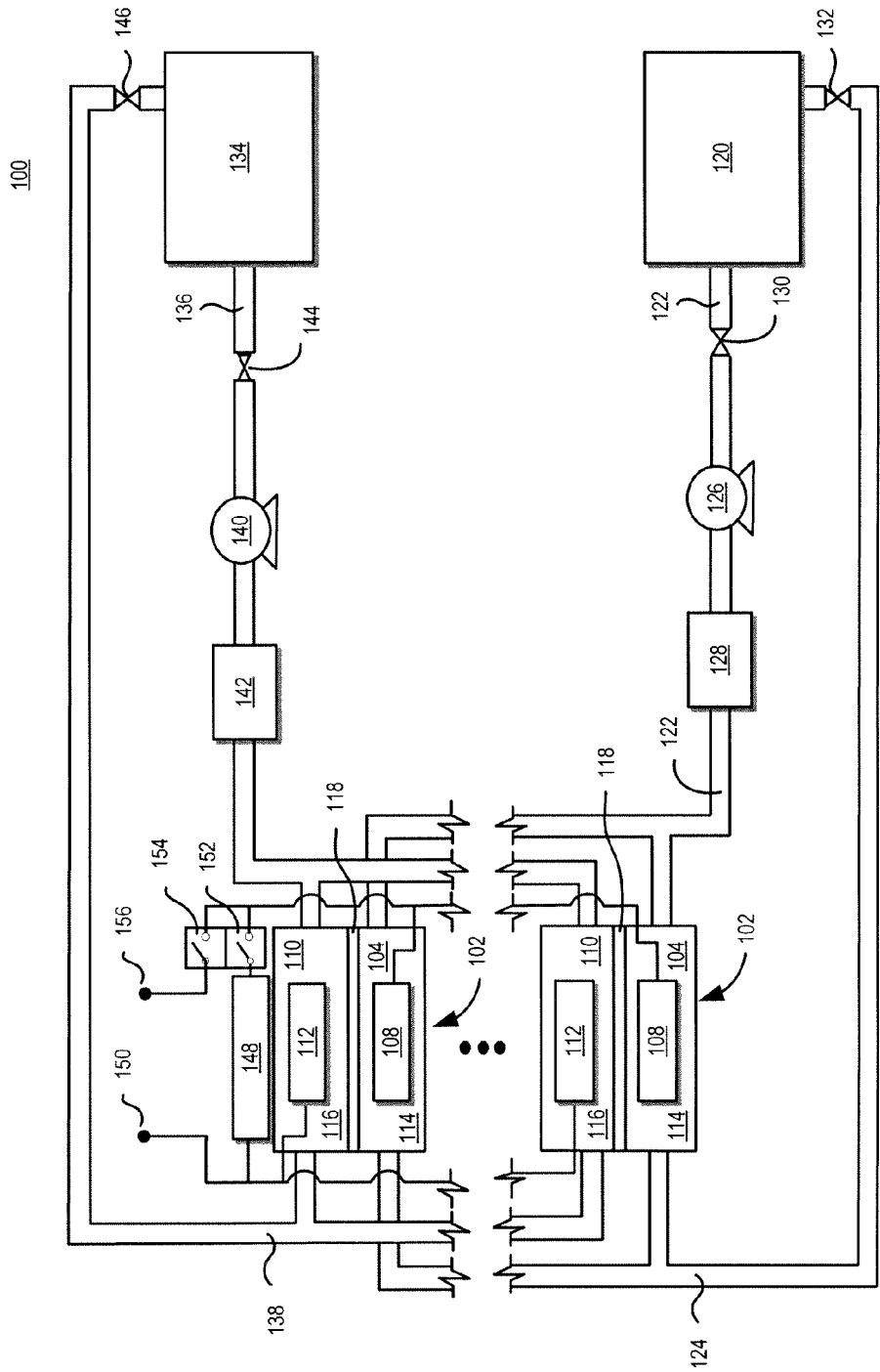
FIG. 1 illustrates a block diagram of a redox battery energy storage system stack consistent with embodiments disclosed herein.

The embodiments of the disclosure will be best understood by reference to the drawings. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

In some cases, well-known features, structures or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

Energy storage systems such as rechargeable batteries are an important part of electrical power systems, particularly electrical power systems supplied by wind turbine generators, photovoltaic cells, or the like. Energy storage systems may also be utilized to enable energy arbitrage for selling and buying power during off peak conditions, as uninterruptible power sources (UPS), in power quality applications, and to provide backup power. Redox flow battery energy storage systems and, particularly, vanadium redox flow battery energy storage systems (VRB-ESS), may be used in such electrical power systems. A redox flow battery energy storage system may respond quickly to changing loads, as is conventionally required in UPS and power quality applications, and may further be configured to have a large capacity, as is conventionally required in energy arbitrage and backup power applications.

A redox flow battery energy storage system generates electrical power by passing anolyte and catholyte electrolyte solutions through reactor cells. Anolyte and catholyte solutions may be collectively described herein as reactants or reactant electrolytes. A redox flow battery energy storage system may include one or more reactor cells depending on the power demands of the system and, consistent with embodiments disclosed herein, may utilize varying amounts of electrolyte solution based on the energy capacity needs of the system. In certain embodiments, the number and cross-sectional area of the reactor cells within the redox flow battery energy storage system may determine the amount of instantaneous power the system is capable of producing. Further, the volume of anolyte and catholyte electrolytic solutions available to the redox flow battery energy storage system may determine its power storage and production capacity.

FIG. 1 illustrates a block diagram of a redox flow battery energy storage system stack 100 and, more specifically, a VRB-ESS, consistent with embodiments disclosed herein. The redox flow battery energy storage system stack 100 may include one or more reactor cells 102 each having a negative compartment 104 with a negative electrode 108 and a positive compartment 110 with a positive electrode 112. The negative compartment 104 may include an anolyte solution 114 in electrical communication with the negative electrode 108. In certain embodiments, the anolyte solution 114 is an electrolyte containing specified redox ions which are in a reduced state and are to be oxidized during the discharge process of a cell 102, or are in an oxidized state and are to be reduced during the charging process of a cell 102, or which are a mixture of these latter reduced ions and ions to be reduced. The positive compartment 110 contains a catholyte solution 116 in electrical communication with the positive electrode 112. The catholyte solution 116 is an electrolyte containing specified redox ions which are in an oxidized state and are to be reduced during the discharge process of a cell 102, or are in a reduced state and are to be oxidized during the charging process of the cell 102, or which are a mixture of these oxidized ions and ions to be oxidized. In certain embodiments, the anolyte and catholyte solutions 114, 116 may be prepared consistent with the disclosure of U.S. Pat. Nos. 4,786,567, 6,143,433, 6,468,688, and 6,562,514, which are herein incorporated by reference in their entireties, or by other known techniques. While the redox flow battery energy storage system illustrated in FIG. 1 is described herein for illustrative purposes as being a Vanadium-based system, other reactant solutions may be utilized.

Each cell 102 of the redox flow battery energy storage system stack 100 may include an ionically conducting separator 118 (e.g., a membrane) disposed between the positive and negative compartments 104, 110 and in contact with the anolyte and catholyte solutions 114, 116 to provide ionic communication therebetween. In certain embodiments, the separator 118 may serve as a proton exchange membrane and may include a carbon material.

In some embodiments, additional anolyte solution 114 may be held in an anolyte storage reservoir 120 that is in fluid communication with the negative compartment 104 through an anolyte supply line 122 and an anolyte return line 124. The anolyte storage reservoir 120 may include a tank, bladder, or any other similar storage container. The anolyte supply line 122 may communicate with a pump 126 and a heat exchanger 128. The pump 126 may enable fluid movement of the anolyte solution 114 through the anolyte reservoir 120, supply line 122, negative compartment 104, and return line 124. In some embodiments, the pump 126 may have a variable speed to allow variance in the generated flow rate. The heat exchanger 128 may be configured to transfer heat generated from the anolyte solution 114 to a fluid or gas medium. In some embodiments, the supply line 122 may include one or more supply line valves 130 to control the volumetric flow of the anolyte solution 114. The return line 124 may communicate with one or more return line valves 132 that control the return volumetric flow.

In some embodiments, additional catholyte solution 116 may be held in a catholyte storage reservoir 134 that is in fluid communication with the positive compartment 110 through a catholyte supply line 136 and a catholyte return line 138. The catholyte supply line 136 may communicate with a pump 140 and a heat exchanger 142. The pump 140, which in some embodiments may be a variable speed pump to allow variance in the generated flow rate, may enable fluid movement of the catholyte solution 116 through the catholyte reservoir 134, supply line 136, positive compartment 110, and return line 138. The heat exchanger 142 may be configured to transfer heat generated from the catholyte solution 116 to a fluid or gas medium. In some embodiments, the supply line 136 may include one or more supply line valves 144 to control the volumetric flow of catholyte solution 116. The return line 138 may communicate with one or more return line valves 146 that control the return volumetric flow.

The negative and positive electrodes 108, 112 may be in electrical communication with a power source 148 and output terminals 150 and 156. A power source switch 152 may be disposed in series between the power source 148 and each negative electrode 108. Likewise, a load switch 154 may be disposed in series between one of the output terminals 156 and each negative electrode 108. Alternative configurations are possible, and the specific configuration of the redox flow battery energy storage system stack 100 illustrated in FIG. 1 is provided as an exemplary configuration of many possible configurations consistent with embodiments disclosed herein.

While the redox flow battery energy storage system stack 100 is charging, the power source switch 152 may be closed and the load switch 154 may be opened. Pump 126 may pump the anolyte solution 114 through the negative compartment 104 and anolyte storage reservoir 120 via anolyte supply and return lines 122, 124. Simultaneously, pump 140 may pump the catholyte solution 116 through the positive compartment 110 and catholyte storage reservoir 134 via catholyte supply and return lines 136, 138. Each cell 102 of the redox flow battery energy storage system stack 100 may be charged by delivering electrical energy from the power source 148 to negative and positive electrodes 108, 112, by, for example, deriving divalent vanadium ions in the anolyte solution 114 and equivalent vanadium ions in the catholyte solution 116.

Electricity may be drawn from each reactor cell 102 of the redox flow battery energy storage system stack 100 from output terminals 150 and 156 by closing load switch 154 and opening power source switch 152. This causes a load coupled with output terminals 150 and 156, to withdraw electrical energy when anolyte and catholyte solution is pumped respectively through the cell 102. In certain embodiments, operation of the various components of the redox flow battery energy storage system stack 100 may be controlled by an electronic control and monitoring system (not shown). Further, power withdrawn from the redox flow battery energy storage system stack 100 may be conditioned using power conditioning equipment (not shown) prior to being provided to the load. Further, as discussed below, in certain embodiments, a power conversation system (not shown) may also be incorporated to convert DC power output from the reactor cell 102 to AC power required by the load. Further, consistent with embodiments disclosed herein, DC power output from the reactor cell 102 may be stepped-up from a nominal output voltage using a DC/DC buck-boost converter prior to being converted to AC power.

A conventional redox flow battery energy storage system may include a plurality of system stacks (e.g., redox flow battery energy storage system stack 100) having output terminals (e.g., output terminals 150 and 156) coupled in series. By coupling multiple system stacks in series, the overall voltage differential output of the system may be increased. For example, if ten system stacks having nominal output voltages of 100 Volts are coupled in series, the total voltage output of the entire system may be 1000 Volts. Coupling system stacks in series, however, may have certain drawbacks. For example, by coupling multiple system stacks in series, inefficiencies and losses caused by shunt electrical currents (e.g., heat) may be increased. To reduce these inefficiencies and losses, complex structures (e.g., shunt channels and/or cooling mechanisms) may be required in the individual system stacks, some of which may increase pumping demands. Moreover, coupling multiple system stacks in series may create a single point of failure for an entire system if one of the system stacks malfunctions.

Figure 2:
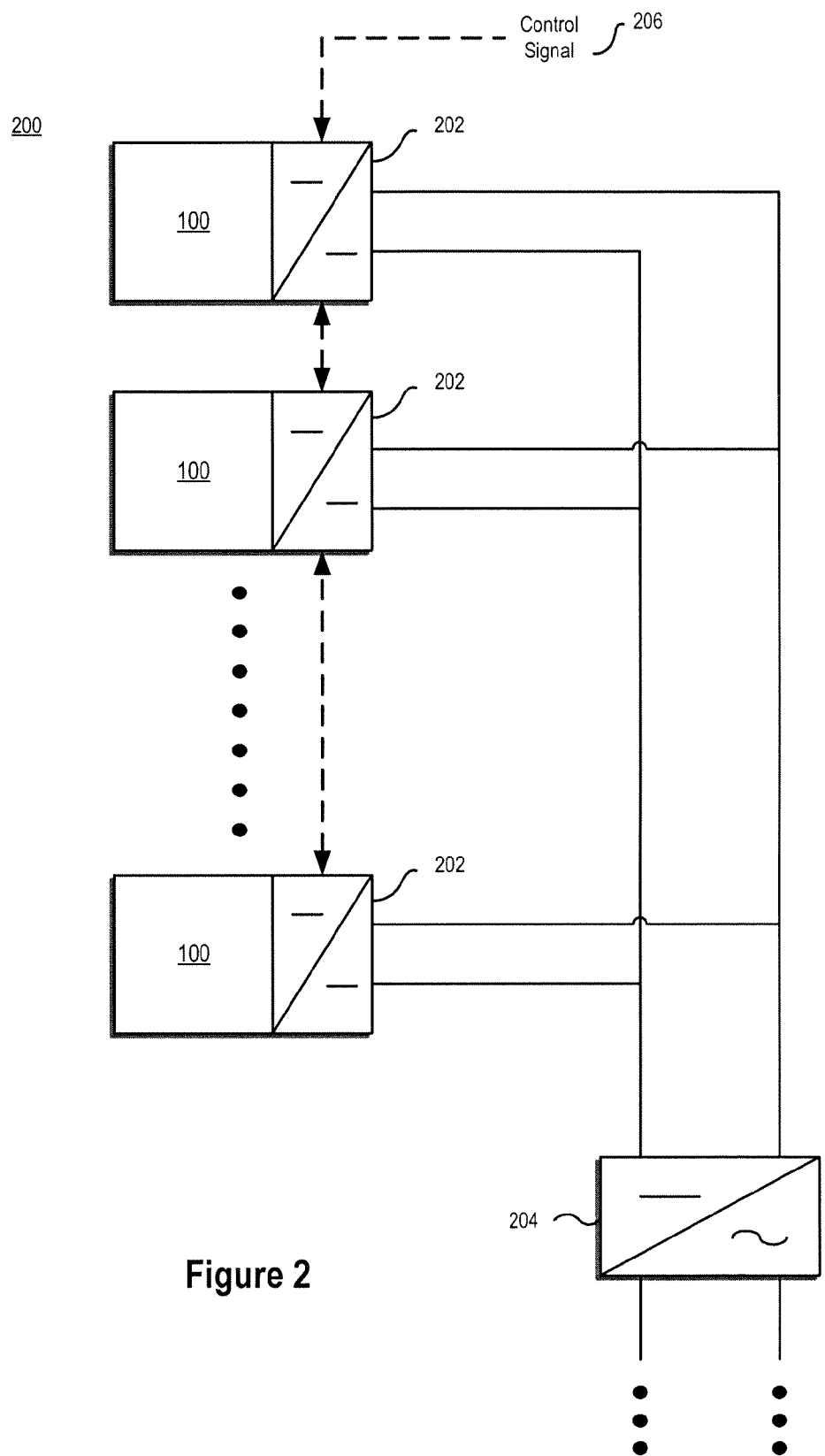
FIG. 2 illustrates a block diagram of a redox battery energy storage system that includes buck-boost DC/DC converters associated with each stack of the system consistent with embodiments disclosed herein.

Consistent with embodiments disclosed herein, a redox flow battery energy storage system that includes a plurality of system stacks may be designed to reduce some of the above-described inefficiencies, losses, and design complexities. Particularly, as illustrated in FIG. 2, a redox battery energy storage system 200 may include a plurality of a redox flow battery energy storage system stacks 100 arranged in a parallel configuration. Each of the system stacks of the plurality of system stacks 100 may be associated a DC/DC converter 202 (e.g., a bi-directional DC/DC buck-boost converter or the like) configured to step-up the nominal output voltage of the individual system stacks 100 to a higher output voltage. Output terminals of the DC/DC converters 202 may be coupled in a parallel configuration to an output bus 208 configured to the higher output voltage to loads and/or power conditioning equipment.

In certain embodiments, the DC/DC converters 202 may be integrated with each of the redox flow battery energy storage system stacks 100. For example, the DC/DC converters 202 may be enclosed by a modular enclosure or frame (e.g., an intermodal container or an intermodal container frame) that is also configured to enclose an associated system stack 100. Integrating redox flow battery energy storage system stacks 100 and associated DC/DC converters 202 together may allow for increased scalability of the system 200, wherein a number of system stacks 100 and associated DC/DC converters 202 included in the system 200 may be varied based on load requirements.

In some embodiments, the DC/DC converters 202 may be buck-boost converters configured to step-up the nominal output voltage of the individual system stacks 100 to a higher output voltage. In further embodiments, the DC/DC converters 202 may be buck-boost converters capable of efficient low power operation, thereby reducing system losses attributable to the DC/DC converters 202. As illustrated, the higher voltage output by the DC/DC converters 202 to the output bus 208 may be converted by a DC/AC converter 204 to AC power, as may be required by loads receiving power from the system 200.

Coupling a plurality of system stacks 100 associated with DC/DC converters 202 in a parallel configuration, as illustrated in FIG. 2, may reduce certain detrimental effects associated with shunt currents. For example, in certain embodiments, smaller system stacks 100 (e.g., sized at or around 100 Volts nominal DC output and/or including approximately 60 cells) may be used in the system 200 than would otherwise be used in a conventional redox flow battery energy storage system, thereby reducing shunt currents. By reducing shunt currents in the individual system stacks 100, the need for integrating complex shunt current channels, larger electrolyte pumps, significant cooling systems, and/or long pipe runs in the system stacks 100 may be reduced. Moreover, the architecture of the redox battery energy storage system 200 may be more cost efficient, reduce voltage stress on the system stacks 100, and increase the operating life of the system stacks 100.

The redox battery energy storage system 200 may also have improved reliability over conventional designs. For example, in circumstances where one or more of the system stacks 100 of the system 200 malfunctions, the system 200 may continue to operate as the parallel architecture of the system stacks 100 introduces system redundancy, wherein non-malfunctioning system stacks 100 may independently carry load demands. In this manner, redox battery energy storage system 200 may not have the same potential for single point failures associated with conventional systems.

As discussed above, the redox battery energy storage system 200 may be scaled by increasing or decreasing the number of storage system stacks 100 and associated DC/DC converters 202 included in the system 200. In certain embodiments, a number of operating system stacks 100 may be varied based on load requirements. For example, as illustrated in FIG. 2, one or more system stacks 100 and/or DC/DC converters 202 may be communicatively coupled to a control signal 206. In certain embodiments, the system stacks 100 and/or DC/DC converters 202 may be directly coupled to the control signal 206 or, as illustrated, may be coupled directly and/or indirectly (e.g., via a system stack 100 and/or DC/DC converter 202) to the control signal 206.

In some embodiments, the control signal 206 may be generated by an external control system (not shown) and be configured to either enable or disable one or more of the system stacks 100 and/or DC/DC converters 202 based on system load demands (e.g., measured, fixed, and/or estimated load demands). For example, if load demands decrease, the control signal 206 may direct one or more of the system stacks 100 and/or DC/DC converters 202 to stop operating. Similarly, if load demands increase, the control signal 206 may direct one or more system stacks 100 and/or DC/DC converters 202 that are not presently operating to provide power to the loads. Charging of the one or more system stacks 100 may be similarly controlled. By scaling the number of operational system stacks 100 and/or DC/DC converters 202 according to load demands, the efficiency of the redox battery energy storage system 200 may be increased.

System stacks 100 and/or associated DC/DC converters 202 may also be individually controlled by the control signal 206 to vary charge and discharge rates of one or more of the system stacks 100. For example, in certain embodiments, each of system stacks 100 and/or associated DC/DC converters 202 maybe associated with separate electrolyte storage reservoirs (e.g., storage reservoirs 120, 134). Charge and discharge rates of one or more of the system stacks 100 may be varied according to load demands by changing the flow rates for electrolyte solutions through the system stacks 100 based on the received control signal 206. By dynamically varying charge and discharge rates of one or more of the system stacks 100 according to load requirements, the overall efficiency of the system 200 may be increased.

Many changes may be made to the details of the above-described embodiments without departing from the underlying principles of this disclosure. The scope of the present invention should, therefore, be determined only by the following claims.

What is claimed is:

1. A redox battery energy storage system comprising:
   a plurality of redox battery energy storage stacks, each stack comprising a plurality of reactor cells;
   an electronic control and monitoring system coupled to the plurality of redox battery energy storage stacks; and
   a plurality of integrated DC/DC converters, wherein each DC/DC converter of the plurality of DC/DC converters is integrated with one of the stacks of the plurality of stacks and is configured to convert the output voltage of the one of the stacks to a higher output voltage at a converter output terminal,
   wherein the converter output terminals of each of the DC/DC converters are coupled in parallel to an output bus,
   wherein the electronic control and monitoring system receives at least one control signal,
   wherein the at least one control signal is indicative of a load demand; and
   wherein the electronic control and monitoring system adjusts the operation of the plurality of redox battery energy storage stacks based on the at least one control signal.

2. The redox battery energy storage system of claim 1, wherein the plurality of DC/DC converters comprise bi-directional buck-boost DC/DC converters.

3. The redox battery energy storage system of claim 1, wherein the redox battery energy storage stacks are vanadium redox battery energy storage stacks.

4. The redox battery energy storage system of claim 1, wherein the plurality of redox battery energy storage stacks and plurality of DC/DC converters are enclosed in a plurality of modular enclosures, wherein each enclosure of the plurality of the enclosures encloses one of the plurality of stacks and one of the DC/DC converters.

5. The redox battery energy storage system of claim 4, wherein the modular enclosures comprise intermodal containers.

6. The redox battery energy storage system of claim 4, wherein the modular enclosures comprise intermodal container frames.

7. The redox battery energy storage system of claim 1, wherein the electronic control and monitoring system is configured to disengage at least one load switch to disable at least one redox battery energy storage stack of the plurality of redox battery storage stacks in response to the control signal being indicative of reduced load demands.

8. The redox battery energy storage system of claim 1, wherein the electronic control and monitoring system is configured to engage at least one load switch to enable at least one redox battery energy storage stack of the plurality of redox battery storage stacks in response to the control signal being indicative of increased load demands.

9. The redox battery energy storage system of claim 1, wherein the output bus is coupled to an AC/DC converter configured to output AC power to one or more loads.

10. The redox battery energy storage system of claim 1, wherein each of the redox battery energy storage stacks of the plurality of redox battery storage stacks are configured to nominally output 100 Volts.

11. The redox battery energy storage system of claim 1, wherein each of the redox battery energy storage stacks of the plurality of redox battery storage stacks comprise 60 reactor cells.

12. The redox battery energy storage system of claim 1, wherein the electronic control and monitoring system instructs at least one of the plurality of redox battery energy storage stacks to adjust a charge rate based on the at least one control signal.

13. The redox battery energy storage system of claim 12, wherein the electronic control and monitoring system instructs the at least one of the plurality of redox battery energy storage stacks to adjust the charge rate by instructing a variable speed pump to adjust a flow rate.

14. The redox battery energy storage system of claim 12, wherein the electronic control and monitoring system adjusts the charge rate of at least one of the plurality of redox battery energy storage stacks by instructing one or more DC/DC converters to disengage a power source switch in response to the at least one control signal indicating it should disengage the power source switch.

15. The redox battery energy storage system of claim 1, wherein the electronic control and monitoring system measures a load demand using a sensor and, based on the measured load demand, instructs a load switch to engage to electrically couple a first of the plurality of redox battery energy storage stacks to a load.

16. The redox battery energy storage system of claim 15, wherein the electronic control and monitoring system instructs a variable speed pump to adjust a flow rate to adjust a discharge rate of a second of the plurality of redox battery energy storage stacks.

17. The redox battery energy storage system of claim 15, wherein the electronic control and monitoring system determines the first of the plurality of redox battery energy storage stacks is not providing power to the load before the electronic control and monitoring system instructs the load switch to engage to electrically couple the first of the plurality of redox battery energy storage stacks to the load.

18. The redox battery energy storage system of claim 1, wherein the plurality of DC/DC converters are configured to receive the at least one control signal, and wherein at least one of the plurality of DC/DC converters is configured to disengage a power source switch in response to the at least one control signal indicating it should disengage the power source switch.

* * * * *